March 8, 1966     U. J. STRINDLUND     3,238,866
MACHINE FOR REMOVING LIQUID FROM LIQUID CONTAINING MATERIAL
Filed March 4, 1964     4 Sheets-Sheet 1
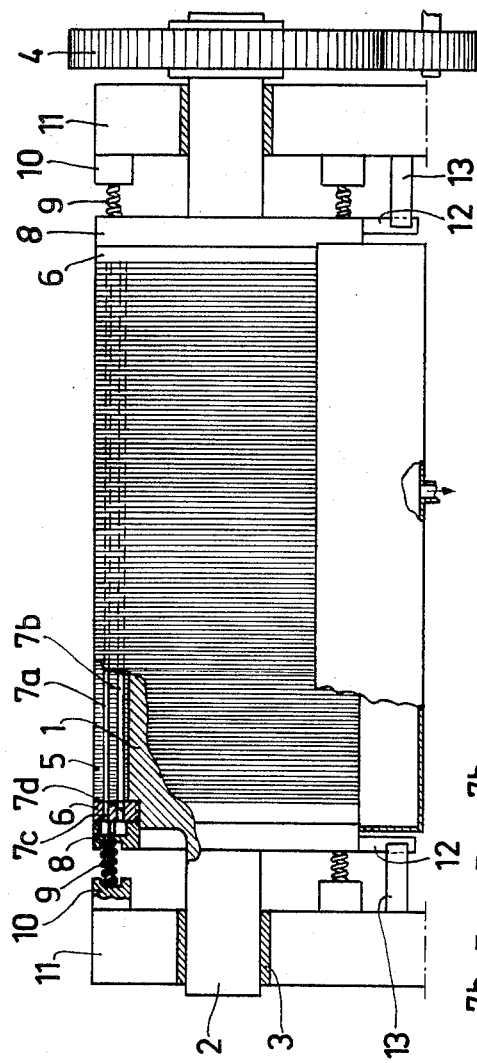
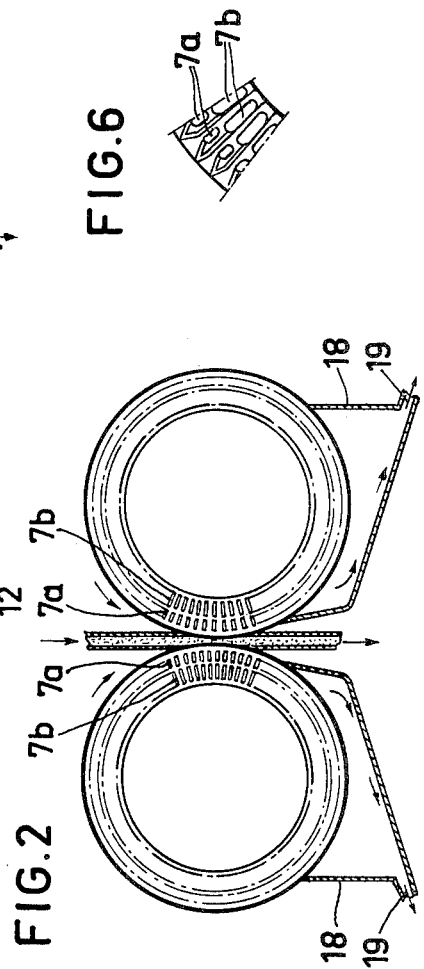
*INVENTOR.*
ULF JOHAN STRINDLUND
BY *Darby & Darby*
ATTORNEYS

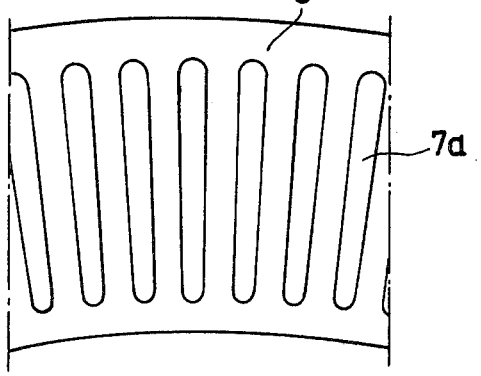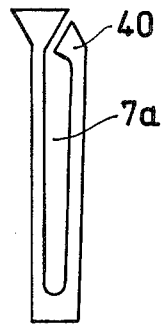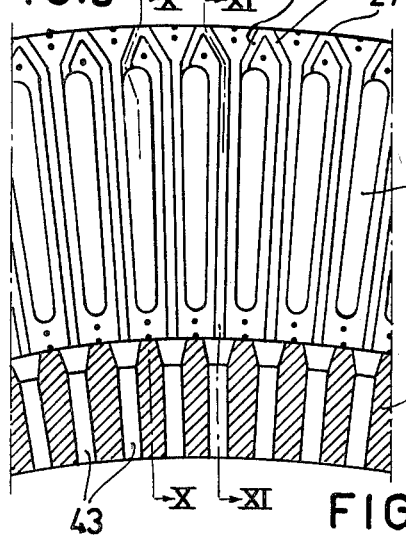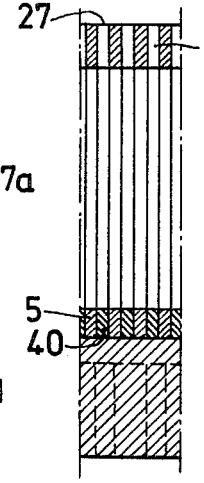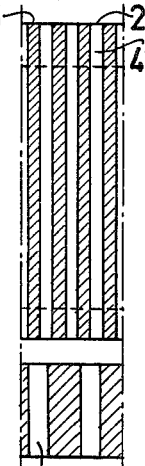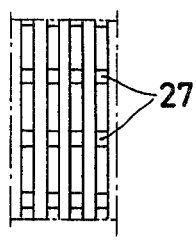

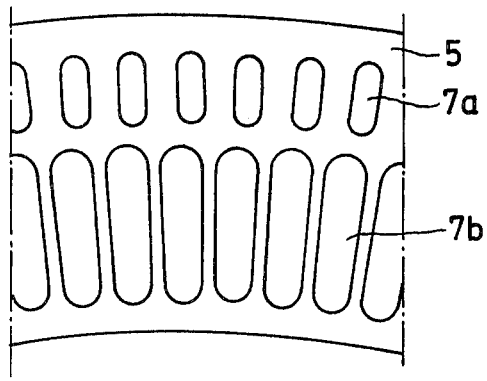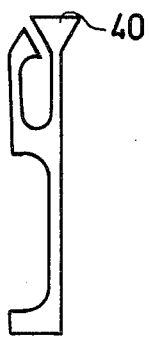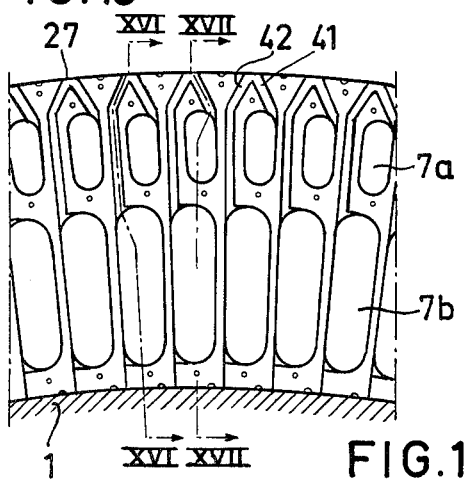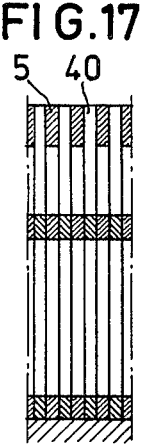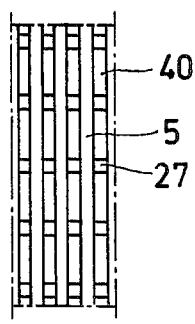

United States Patent Office 3,238,866
Patented Mar. 8, 1966

3,238,866
MACHINE FOR REMOVING LIQUID FROM
LIQUID CONTAINING MATERIAL
Ulf Johan Strindlund, Mackmyra, Sweden
Filed Mar. 4, 1964, Ser. No. 349,452
Claims priority, application Sweden, June 13, 1963,
6,564/63
8 Claims. (Cl. 100—90)

This invention is a continuation-in-part of my application No. 316,212 and relates to a machine for removing liquid from liquid containing materials, and more particularly to a machine for dewatering fibrous lignocellulose containing materials having, for example, sheet or web shape by subjecting the material to pressing between two pressing means and pressing the liquid pressed out into cavities provided in at least one of said pressing means. The invention, further, relates to a machine for carrying out the method.

In the manufacture of paper, card-board or pulp the fibres are suspended in water when they are supplied to the paper machine, cardboard machine or drying machine. The largest portion of the water is drained in the wire part of the machine. From an economical point of view it is of advantage to remove by pressing as much of the remaining water as possible. This pressing is normally carried out by roller presses in the press section of the machine. The rolls comprised in roller presses for paper pulp may be of iron with a grooved face (high pressure rolls) or they may be rolls covered with rubber and a textile felt provided between the rolls and running along with them (felt presses). In papermaking machines felt presses are used having their lower roll provided with a suction box which is connected to a vacuum pump.

Between two presses in the press section there are usually provided one or several steam-heated rotary cylinders adapted to increase the temperature of the fibrous web and thereby to facilitate the pressing out of the water in subsequent rolls.

The dry content obtained in the described manner (in the wet section) is about 35% in paper-making machines, about 44% in drying machines (paper pulp) and about 50% with high pressure presses which are now rarely employed.

The amount of pressure effected by the upper roll on the fibrous web against the lower roll is in presses for paper pulp at maximum 300 kg. per centimetre of length of the roll. In the case of high surface weights (thick fibrous web) and slow-speed machines, the pressure may amount up to 450 kg. per centimetre of roll length. When the amount of pressure is made to exceed the said limits, the fibrous web splits as a result of a phenomenon which usually is called "crush." Such "crushes" appear in the web after the press in the form of flockiness. Such flockings consist of fibre accumulations and fibre thinnings in the web, making the web in certain points less and more transparent respectively. Flockiness is caused when the water (water particles), which at high pressure is to be pressed out of the so-called nip of the press rolls, is enclosed in the web and in that part thereof which is located in the nip proper, due to the difficulty of the water to be displaced in the direction opposite to the direction of motion of the web. Due to the very high water pressure in the said nip, minor water explosions occur whereby fibres are taken along and cause the aforesaid fibre accumulations and thinnings respectively. The said water explosions to some extent have probably the same direction as the web. When the amount of pressure applied is increased too much, the web breaks in the point where the pressure is applied (in the nip), due to the aforesaid crush phenomenon. This occurs also when the speed of the web is increased too much, due to the fact that in the latter case the water is not given sufficient time for retarding to the speed of zero and for acceleration in opposite direction to the fibrous web, the speeds being calculated in relation to the nip standing still. The risk that water will be enclosed in the nip and cause "crushes" increases with increasing roll diameter, because the nip length increases with the roll diameter. There is, on the other hand, the requirement that in machines for pressing very wide webs the roll diameters must be increased, in view of the stiffness of the rolls to provide resistance to bending at the high pressures applied. The problem is, thus, to satisfy two requirements opposing one another.

The present invention eliminates the said shortcomings and renders it possible to obtain dry contents exceeding 50% and even 57% by using the roll as a press roll. This improved result is achieved in that the water in the fibrous web need not move in a direction opposite to the direction of motion of the web from the nip, but only substantially at a right angle to the web into the cavities in the roll.

As one prerequisite condition, however, the surface of the roll must be provided with a great number of small openings at such small distances between each other that "crushes" between the said openings do not occur. The diameter of said openings must be adjusted to the length of the fibres and the thickness of the web, in order to prevent fibres from being pressed into the openings and being retained therein. By meeting this requirement, it is possible to increase both the pressure per centimetre of roll length and the speed of the web without thereby causing "crushes."

It is known that conventional rolls of small diameters render at a given amount of pressure (per centimetre of roll length) a better result than rolls of large diameters. This is due to the fact that at rolls of smaller diameter the water flows off easier from the nip, and that the amount of pressure (per centimetre of roll length) to a greater extent will be a linear pressure and not a surface pressure.

The present invention eliminates the said difference with respect to the water drainage, so that the roll diameter is only of importance with respect to the linear pressure.

By employing the present invention it is possible to increase the amount of pressure of roller presses (per centimetre of roll length) considerably and thus to obtain correspondingly improved results. It further is possible to use rolls of plastic material, but in such a case the decrease of surface pressure in the nip caused by the extension of the nip sector must be compensated for by an additional increase of the amount of pressure applied. It may in such cases be necessary to work with pressure amounts which are up to twice as high as used heretofore. Rolls of plastic material are adapted for use in the present invention because of the extension of the nip sector obtained thereby. Due to the fact that the fibrous web will stay longer in the nip, the requirements with respect to the acceleration of the water will be lower and, thus, allow an additional increase of the web speed.

A further requirement for obtaining best possible results is to prevent the water pressed out of the fibrous web and into the cavities of the roll from being re-sucked by the material to be pressed. This is achieved in that gas is supplied to the cavities in such a manner, that the water pressed out is removed from the contact with the surface of the material to be pressed and, thus, cannot be re-sucked into said material when the pressure ceases.

The machine according to the invention is characterized in that gas is supplied to the cavities at or in close connection to their points of contact with the material surface, in such a manner, that the liquid is removed there-from. The removal of liquid and the supply of gas is preferably effected by a difference of pressure in the means provided for conducting away the liquid and for feeding the gas. The gas used may advantageously be air or superheated steam, supplied through cavities in the pressing member.

The pressing members may, for example, be rolls or plates, as for instance used in a multiple-platen press. The gas may be subjected to overpressure and/or the liquid may be removed by applying vacuum in the roll cavities whereby gas is supplied (in this indirect way) to the cavities.

A suitable way of supplying the gas for removing the liquid pressed out from contact with the material surface is to pass the gas, for example overheated steam, through the cavities in the pressing members immediately after the removal of the liquid. Hereby, the cavities are maintained clean and no clogging can occur. When applying this embodiment, the cavities are, thus, flushed by the gas at and in close connection with the nip. In a preferable embodiment of the invention the pressing members are two rolls, arranged such that the cavities on the surface of one pressing member abut against (correspond to) a smooth surface on the opposite pressing member, and vice versa.

The machine according to the invention is characterized by two pressing members for pressing the material therebetween, at least one of said pressing members being provided on its surface facing the material with a great number of openings, which openings are connected with passages provided in the pressing member for conducting away liquid and gas, or steam. The said machine further comprises at least one means for supplying gas or steam in such a manner, that the contact between the liquid pressed out and the material is interrupted thereby. The last mentioned means may be passages arranged in the pressing member and communicating with openings provided in the pressing member for conducting away liquid. The pressing members may be constructed of adjacent disc elements, for example such rolls as described in detail in U.S. patent application Serial No. 316,212, filed on October 15, 1963, which is made now also part of the present invention, or they may be constructed of a core or a tube covered with plastics.

The pressing member or members provided with a great number of openings may in the said machine also be pressing plates, for example of the type used in a multiple-platen press. When using a roll as pressing member, said roll may be of any construction and, besides of the aforesaid discs and plastic casings, consist of a solid roll. In a solid roll or a roll with a casing of plastics, there are provided holes or passages, for example by boring.

A pressing member in a machine according to the invention may also be a tube roll provided with a casing of, for example, plastics. In said casing a great number of radially extending holes is arranged, and by applying vacuum on the tube suction action is effected in all of said holes. This embodiment of a pressing member for use in the machine according to the invention may be modified in such a manner, that the roll is provided with an internal sector, a so-called suction box, for restricting the vacuum to holes disposed along only a portion of the periphery, i.e. the portion comprising the nip and possibly portions in its vicinity. According to another modification, a large portion of the periphery is covered by a felt, rubber cloth or the like which participates in the rotation of the roll and thereby restricts the sucking to its greater extent to a portion of the periphery.

The material of the roll must be chosen to be of suitable elasticity. In the case of steel, for example, the length of the nip for a certain roll is 3–4 mm. at an amount of pressure of 300 kg. per centimetre of roll length. For a certain plastics, in a roll of the same diameter a nip length of about 10 mm. is obtained at the same amount of pressure, and a nip of about 16 mm. at a pressure of 600 kg./cm. For plastic rolls (elastic rolls) it is therefore necessary to use higher amounts of pressure, whereby nevertheless a lower pressure per surface unit is obtained. On the other hand, at same web speeds the pressing time in plastic rolls will be longer. The distance between the holes (openings) in the roll surface is of great importance. The holes are preferably to be arranged such, that their division in axial direction is smaller than in circumferential (tangential) direction. For a pulp web (paper pulp) the division in axial direction should, for example, be 2–3 mm. The division in tangential direction depends on whether both or only one of the rolls (pressing member) is constructed according to the invention. In a preferable embodiment of the invention, the pressing members are two rolls arranged opposite one another, the division between the holes, i.e. the distance between the centre of two adjacent holes, being in tangential direction $5/32''$ and in axial direction at maximum $1/8''$. The said division shall be independent of which rolls are contributing with holes.

When employing only one roll with holes (pressing member according to the invention) against a smooth roll, the division in tangential direction shall preferably not exceed 3.5–4 mm. When both rolls are constructed according to the present invention, the said division may be twice as great. For a pulp web (paper pulp) the size (diameter) of the hole shall be 1–1.5 mm. The hole need, of course, not be circular, but may have a different shape, for example square shape whereof the side has about the values indicated. In general it may be said that in the case of short fibre lengths and a thin fibrous web (pulp web) there is a higher requirement with respect to a small divisional distance between the holes and to a small hole size (hole diameter). In the case of paper web, for example, it may be imagined that it is necessary to work with a divisional distance and a hole diameter smaller than indicated above. As, however, too small a divisional distance causes too small a surface for supporting the material, the said divisional distance must not be decreased too much.

The present invention will be described in greater detail in the following, reference being had to the accompanying drawings showning an arrangement according to the invention in the form of a roll constructed of discs.

FIG. 1 shows partly in section the roll mounted in its stand.

FIG. 2 shows in a cross-section an arrangement according to the invention comprising two rolls cooperating with one another.

FIG. 6 shows on an enlarged scale a partial view of a roll segment in the rolls according to FIG. 2.

FIG. 7 shows a partial disc which by means of parts constructed according to FIG. 8 can be assembled to a disc as shown in FIG. 9.

FIGS. 10–12 show rolling mills comprising such discs, FIGS. 10 and 11 being sections along the lines X—X and XI—XI in FIG. 9.

FIGS. 13–18 show a different embodiment of discs for the construction of a pressing member in an arrangement according to the invention, said figures corresponding to FIGS. 7–12. FIGS. 16 and 17 are sections along the lines XVI—XVI and XVII—XVII in FIG. 15.

Figure 3:
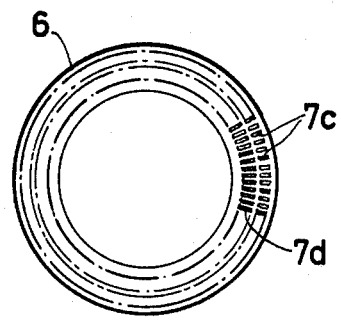
FIG. 3 shows a lock ring for a roll.
Figure 3A:
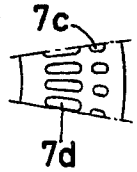
FIG. 3a is a view showing in detail a section of a ring according to FIG. 3.

The roll shown in FIG. 1 is comprised as a pressing member in a machine according to the invention. The said roll consists of a core 1 of steel which in the embodiment according to FIGS. 7–12 may be hollow and provided with radially directed holes for effecting communication between the hollow space of the core and passages provided in the discs surrounding the core. At both ends of the roll there are journals 2 supported in bearings 3. One of said journals is extended for a drive wheel 4. On the outside of core 1, a casing of tightly adjacent discs 5 of corrosion-proof material, for example, steel or a non-ferrous metal, is mounted. The discs 5 may have teeth at their inner edge which fit accurately into grooves provided along the periphery of core 1. In this way, the discs 5 are in accurately fixed relationship with each other, so that recesses 7a and possibly recesses 7b in the discs 5 will lie directly in front of one another and, thus, form passages of axial extension in the roll. Lock rings 6 mounted at the ends of the roll maintain the discs 5 tightly pressed together. Said lock rings 6 are provided with holes 7c which as to their number, size and position correspond to the said recesses 7a in the discs 5. Lock ring 6 has also holes 7d at the recesses 7b in the discs, which holes correspond to said recesses 7b.

Figure 4:
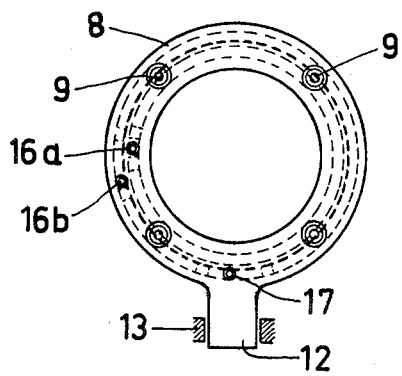
FIGS. 4 and 5 show an end wall of the roll.
Figure 5:
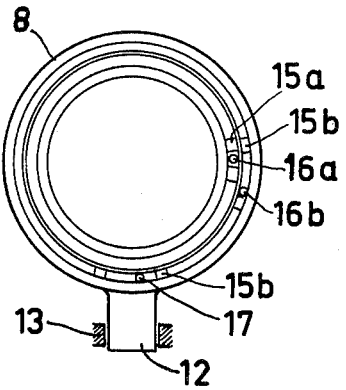
Figure 5A:
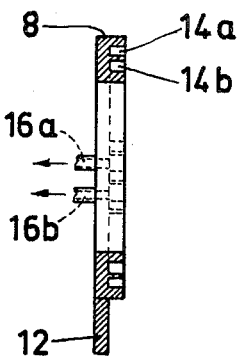
FIG. 5a is a view of a diametrical cross section of the wall according to FIG. 5.

In FIGS. 1 and 4 end walls 8 are shown which are pressed tightly against the lock rings 6 by helical springs 9. The springs 9 are supported on blocks 10 in the stand 11 wherein the bearings 3 for the roll are mounted. The end walls 8 are prevented from rotating with the roll by a lever 12 guided between supports 13 in the stand 11. In the end walls 8 facing the lock rings 6 recesses 14a and 14b are provided, in which recesses blocks 15a and 15b are placed to form tight partitions and to separate the cavities in the circle sections for connection, for example, to compressed air. Pipe ends for delivery and discharge of gas and/or liquids (water) are shown at 16a, 16b and 17.

In FIG. 2 there diagrammatically is shown two rolls according to the invention; the rolls being demonstrated in section and squeezing a fibrous web therebetween. The reference numerals 7a and 7b are designated to passages for delivery of gas and for discharge of liquid and gas. Below each roll is shown a trough 18 having a discharge means 19 where rinsing agents as, e.g., steam or water, forced through the passages can be collected and discharged. In FIG. 3 is shown a lock ring 6 having holes 7c and 7d constituting connections between the passages in the roll and the end walls.

FIG. 6 shows in section a partial view of a roll comprised as a pressing member in an arrangement according to the invention. It appears from this figure, that the roll is provided with two axially extending systems of passages 7a and 7b, one system serving for the supply of gas and the other system serving for conducting away liquid and gas.

FIG. 7 shows a disc provided with recesses 7a. On this disc elements 40 according to FIG. 8 are mounted such, that recesses 7a in the elements fit to recesses 7a in the disc 5, thereby producing an assembled disc as shown in FIG. 9. In FIG. 9 the said disc is mounted on a hollow core 1 provided with bores 43. On the said core discs of the design shown are placed adjacent each other, so that the recesses 7a form axially extending passages. The roll thus obtained is provided with openings 27 which on one side communicate with the core interior through passages 42 and the bores 43, and on the other side communicate with the said axial passages 7a by passages 41. In FIG. 10 the roll is shown in section along the line X—X of FIG. 9 and in FIG. 11 along the line XI—XI of FIG. 9. FIG. 12 shows the roll seen from above.

In FIGS. 13–18 another embodiment of a roll is shown which is constructed of discs on a solid core 1. In this embodiment two recesses 7a and 7b are provided in every disc 5 to form axially extending passages in the roll. The recesses 7a communicate through passages 41 with openings 27 in the roll surface. The recesses 7b communicate in a corresponding manner through passages 42 with the openings 27. The discs 5 are in this embodiment secured to core 1 by spot welding.

The arrangements of FIG. 6 through 18 are in many ways similar to the arrangements depicted in FIGS. 20 through 22 of my copending application above-identified.

It is to be noted that the double passage arrangement of these figures, although disclosed in the earlier application, is not claimed therein, but is claimed only in the instant application.

The mode of operation of the invention will now be described in greater detail with reference to FIG. 15. During the operation of the roll air is supplied through the passages 7b so that an overpressure is produced at the opening 27 when it is at the nip of a roll mounted opposite to the first mentioned roll, as shown in FIG. 2. The water pressed out is conducted away, possibly under vacuum, through the passages 7a via the passages 41. When the opening 27 gets out of connection with the nip, no water can be re-sucked in spite of the re-sucking (rewetting) tendency of the material being pressed, because the connection with the water is interrupted by means of compressed air. It is not necessary that the air must be under pressure nor that the liquid is conducted away by sucking action. What is essential is that there is a positive pressure difference between the passages 7b for the supply of air and the passages 7a for conducting away the liquid. Instead of air also any other gas may, of course, be used, and the passages for gas and liquid may, of course, be of inverted arrangement.

It is not necessary to construct the arrangement according to the invention of rolls assembled of discs. It can even be imagined to produce a roll by boring the passages. The holes may be obtained by casting, for example, a casing of plastic material. It is neither necessary that the pressing members must be rolls, they may even be the pressing plates in a multiple-platen press.

The expression "very great number" used in this specification and claims is intended to mean at least 100 openings per square decimeter surface area of the squeezing element; this number of openings is especially true when using plates as squeezing elements. In case of rolls this number suitably exceeds 300 and most often 600 and there is preferably used approximately 1000 holes per square decimeter roll surface area. When using squeezing roll press wherein both rolls are constructed with holes according to this invention and in the nip the holes of one squeezing roll alternate with the holes in the other squeezing roll this number can be halved.

The highest efficiency according to the invention is obtained when both pressing members are constructed like the rolls described, but satisfactory results are even achieved by using a pressing member of the conventional type together with the member described. When a roller press is constructed as the arrangement according to the invention, it may be suitable, particularly in the case of thin fibrous webs, to apply an endless web of wool or artificial fibre, for example, polyamide fibre (nylon fibre), between the roll and the fibrous web. The said endless textile web is directed in known manner, for example over guide rolls. In roller presses constructed as an arrangement according to the invention the fibrous web may be directed both horizontally and vertically through the nip, and in the latter case the direction may be upwards or downwards.

Steam may be supplied to the present arrangements in known manner to a portion of the roll which is not in connection with the nip, for flushing clean the passages and other cavities when they are not in connection with the surface portion of the pressing member which is in contact with the material to be de-watered. As mentioned before, said passages and other cavities may also be cleaned by flushing them with hot gas, for example hot air, but preferably with super-heated steam. The temperature should preferably be above 100° C. but below the temperature at which the plastics will melt or be deformed. The said flushing with gas may suitably be carried out immediately after the liquid is sucked off as described.

What I claim is:

1. In a machine for removing liquid from a liquid containing material, in combination, a pair of members between which said material is squeezed, a very large number of small openings in the surface of at least one of said members adjacent the material, each said opening communicating with a channel in said squeezing member for discharging liquid squeezed from said material and each said opening also communicating with a channel in said squeezing member for supplying gas to said opening.

2. In a machine for removing liquid from a liquid containing web of material, in combination, a pair of pressure rolls mounted to rotate with their surfaces in contact to form a nip through which the web passes, a plurality of small openings in the surface of one of said rolls, a plurality of axially extending passages formed in said one roll, said passages being arranged in two sets, and means connecting each of said surface openings of said one roll with a passage of each of said sets of axial passages whereby each said surface opening may be simultaneously connected with discharge means for removing liquid from said web at the nip and with gas discharge means for interrupting the liquid column flowing to said opening to prevent reabsorption of liquid as the web passes the roll nip.

3. In a machine for removing liquid from a liquid containing web of material, in combination, a pair of press rolls mounted to rotate together to form a nip through which the web passes, at least one of said rolls comprising a core, a plurality of discs mounted on said core, each said disc having a plurality of peripheral opening therein, a plurality of axial passages in said roll, said passages being arranged in two sets, and means joining each peripheral opening of each said disc to an axial passage of each said set.

4. A machine as claimed in claim 3, wherein one of said sets of axial passages is formed in said core and the other said set is formed in said discs.

5. A machine as claimed in claim 3, wherein both of said sets of axial passages are formed in said discs.

6. In a machine of the class described, in combination, a core, a plurality of discs assembled on said core, each disc having a plurality of axially extending openings therein arranged in two sets, the openings of one set being more remote from said core than those of the other, a plurality of peripheral openings in each disc and means connecting each peripheral opening to a pair of axial openings, said pair of axial openings consisting of one opening of each set.

7. A machine as claimed in claim 6, wherein said discs are identical and alternate discs face in opposite directions whereby peripheral openings are formed in axially extending rows in alternate discs, the circumferentially adjacent openings being formed in axially extending rows in the remaining discs.

8. A machine as claimed in claim 6 wherein said discs are identical and face in the same direction and wherein said discs are spaced apart by members fixed thereto, said members being shaped to form peripheral openings and passages connecting each peripheral opening to a pair of axially extending openings of the corresponding disc.

References Cited by the Examiner

UNITED STATES PATENTS

| 1,739,593 | 12/1929 | Inglefield et al. | 15—306 |
| 1,834,852 | 12/1931 | Kutter | 100—121 |
| 1,908,519 | 5/1933 | Leonard | 100—174 X |
| 2,082,411 | 6/1937 | Merrill | 15—306 |
| 2,696,148 | 12/1954 | Hornbostel. | |
| 2,875,846 | 3/1959 | Yonkers | 15—306 X |
| 2,958,379 | 11/1960 | Hornbostel | 162—368 X |

FOREIGN PATENTS

| 476,973 | 9/1951 | Canada. |
| 900,297 | 12/1953 | Germany. |

WALTER A. SCHEEL, *Primary Examiner.*

LOUIS O. MAASSEL, IRVING BUNEVICH, *Examiners.*